(12) United States Patent
Yamasaki

(10) Patent No.: US 8,922,848 B2
(45) Date of Patent: Dec. 30, 2014

(54) READING UNIT AND IMAGE READING APPARATUS

(71) Applicant: Yasuo Yamasaki, Nagoya (JP)

(72) Inventor: Yasuo Yamasaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/169,531

(22) Filed: Jan. 31, 2014

(65) Prior Publication Data

US 2014/0211270 A1    Jul. 31, 2014

(30) Foreign Application Priority Data

Jan. 31, 2013   (JP) .................................. 2013-016497

(51) Int. Cl.
*H04N 1/04* (2006.01)
*H04N 1/028* (2006.01)
*H04N 1/10* (2006.01)

(52) U.S. Cl.
CPC ............. *H04N 1/1065* (2013.01); *H04N 1/028* (2013.01)
USPC ............................ 358/474; 358/497; 358/486

(58) Field of Classification Search
CPC ............. H04N 1/103; H04N 1/00559; H04N 2201/0081; H04N 2201/04791; H04N 2201/04798; H04N 1/04; H04N 1/00; H04N 1/191; H04N 1/10; H04N 1/193; H04N 1/047; H04N 1/50
USPC .......................... 358/474, 497, 486, 488, 496
See application file for complete search history.

(56) References Cited

U.S. PATENT DOCUMENTS

| | | | |
|---|---|---|---|
| 5,760,412 A * | 6/1998 | Yang et al. .................. | 250/559.4 |
| 5,920,681 A * | 7/1999 | Hori ............................... | 358/1.5 |
| 6,285,441 B1 | 9/2001 | Takahara | |
| 7,537,322 B2 * | 5/2009 | Ishikawa et al. ................ | 347/85 |
| 7,653,223 B2 * | 1/2010 | Ouchi ........................... | 382/124 |
| 7,653,322 B2 * | 1/2010 | Maeda et al. .................. | 399/69 |
| 7,800,797 B2 * | 9/2010 | Suzuki .......................... | 358/497 |
| 7,911,663 B2 * | 3/2011 | Tamai .......................... | 358/497 |
| 7,969,621 B2 * | 6/2011 | Shunji .......................... | 358/474 |
| 8,233,161 B2 * | 7/2012 | Saito ............................ | 358/1.13 |
| 8,434,852 B2 * | 5/2013 | Hagiwara ....................... | 347/20 |
| 8,547,604 B2 * | 10/2013 | Kozaki et al. ................. | 358/474 |
| 8,696,093 B2 * | 4/2014 | Ozawa et al. .................. | 347/71 |
| 8,727,468 B2 * | 5/2014 | Iwakura ............................ | 347/8 |
| 2007/0002398 A1 | 1/2007 | Ohama et al. | |

FOREIGN PATENT DOCUMENTS

JP    2007-43683 A    2/2007
JP       4011700 B2    9/2007

* cited by examiner

*Primary Examiner* — Negussie Worku
(74) *Attorney, Agent, or Firm* — Merchant & Gould PC

(57) ABSTRACT

A reading unit includes a carriage extending in a first direction, and an image sensor configured to be supported by the carriage, and having a case extending in the first direction and a plurality of light receiving elements contained in the case and arranged in the first direction. The carriage has a reference surface, a pair of supporting portions provided at two end sides in the first direction, and one end edge positioned on one side, with respect to the reference surface, in a second direction orthogonal to the first direction and parallel to the reference surface, and the case has a pair of supported portions provided to correspond to the pair of supporting portions and configured to be supported swingably by the corresponding supporting portions. The case is configured to swing about a first axis between a first position and a second position.

7 Claims, 14 Drawing Sheets

READING UNIT AND IMAGE READING APPARATUS

CROSS REFERENCE TO RELATED APPLICATION

The present application claims priority from Japanese Patent Application No. 2013-016497, filed on Jan. 31, 2013, the disclosure of which is incorporated herein by reference in its entirety.

BACKGROUND OF THE INVENTION

1. Field of the Invention

The present invention relates to a reading unit and an image reading apparatus.

2. Description of the Related Art

A conventional reading unit which includes a carriage extending in a first direction and an image sensor has been known. The image sensor has a case extending in the first direction and a plurality of light receiving elements contained in the case and aligned in the first direction. The carriage supports the image sensor thereby constituting the reading unit.

In more detail, the carriage has a reference surface facing the bottom surface of the image sensor in a state that the image sensor is supported by the carriage, a pair of supporting portions provided respectively on both sides in the first direction, and one end edge positioned on one side of the reference surface in a second direction orthogonal to the first direction and parallel to the reference surface. The case has a pair of supported portions provided at positions corresponding to the pair of supporting portions. The pair of supported portions are swingably supported by the corresponding supporting portions, respectively.

The case is configured to be swingable about a first axis which is parallel to the first direction and close to the one end edge, between a first position at which the case is inclined in a direction away from the reference surface and a second position at which the case is positioned close to the reference surface, by of the pair of supported portions being supported by the pair of supporting portions of the carriage.

Between the carriage and the case, a positioning portion is provided to position the case with respect to the carriage in the first direction. The positioning portion includes a projection and a recess. The projection is provided on a side of the one end edge of the carriage to project from the reference surface toward the case in a state that the case is at the second position. The projection has a flat upper surface at a height which is equal from the reference surface of the carriage with respect to the first direction and the second direction. The recess is provided in the case and the projection is fitted into the recess in the state that the case is at the second position. In the reading unit, this kind of positioning portion is used to position the image sensor with respect to the carriage in the first direction.

SUMMARY OF THE INVENTION

However, in the above conventional reading unit, there is a matter of concern that if some impact or the like acts in such a manner as to separate the case of the image sensor from the reference surface of the carriage, then the fit-in between the projection and the recess of the positioning portion may fail, and thus the image sensor can no longer be positioned with respect to the carriage in the first direction. As a measure against this problem, it is conceivable to increase the height of the projection so as to expand the length of the fit-in between the projection and the recess. However, if simply the height of the projection is increased, then the projection becomes more likely to interfere with the case displacing between the first position and the second position, thereby decreasing efficiency in the fitting work of causing the carriage to support the image sensor while swinging the image sensor from the first position to the second position.

The present invention is made in view of the above situation existing conventionally, and an object thereof is to provide a reading unit and an image reading apparatus capable of realizing a thin body and capable of positioning the image sensor with respect to the carriage with high precision.

According to a first aspect of the present invention, there is provided a reading unit comprising: a carriage extending in a first direction; and an image sensor configured to be supported by the carriage, and having a case which extends in the first direction and a plurality of light receiving elements which are contained in the case and arranged in the first direction, wherein: the carriage has a reference surface, a pair of supporting portions provided at two end sides in the first direction, and one end edge positioned on one side, with respect to the reference surface, in a second direction orthogonal to the first direction and parallel to the reference surface; the case has a pair of supported portions provided to correspond to the pair of supporting portions and configured to be supported swingably by the corresponding supporting portions, respectively; the case is configured to swing about a first axis being parallel to the first direction and positioned close to the one end edge, between a first position at which the case is inclined in a direction away from the reference surface, and a second position at which the case is positioned close to the reference surface, by the pair of supported portions being supported by the pair of supporting portions of the carriage; a positioning portion configured to position the case relative to the carriage in the first direction is provided between the carriage and the case; the positioning portion comprises a projection provided on the carriage to project from the reference surface toward the case in a state that the case is at the second position, and a recess provided in the case and into which the projection of the case is fitted in the state that the case is at the second position; and the projection is formed with a first portion positioned at the side of the one end edge and set at such a height as to avoid interfering with the case in a state that the case is at the first position, and a second portion separated farther from the one end edge than the first portion in the second direction, having a height from the reference surface higher than that of the first portion, and configured to fit into the recess of the case in the state that the case is at the second position.

In the reading unit of the present invention, the projection is formed with the first portion and the second portion. Then, the first portion is positioned on the side of the one end edge and set at such a height as to avoid interfering with the case in the state that the case is at the first position. The second portion is separated farther from the one end edge of the carriage than the first portion in the second direction. By virtue of this, because it is possible to increase the angle between the first position and the second position, the second portion situated higher from the reference surface than the first portion becomes less likely to interfere with the case in the state that the case is at the first position. Then, by swinging the case from the first position to the second position to fit the second portion into the recess at the second position, it is possible to increase the fit-in length between the second portion and the recess by raising only the height of the second portion but not raising the height of the entire projection. As a result, in the reading unit, even if some impact or the like acts to separate the case of the image sensor from the reference surface of the carriage, it is still less likely to fail the fit-in between the projection and the recess of the positioning portion.

Therefore, it is possible for the reading unit of the present invention to realize a thin body of the unit while positioning the image sensor relative to the carriage with high precision.

According to a second aspect of the present invention, there is provided an image reading apparatus including: a carriage extending in a first direction; an image sensor configured to be supported by the carriage, and having a case which extends in the first direction and a plurality of light receiving elements which are contained in the case and arranged in the first direction; a housing configured to support a platen and accommodate the reading unit below the platen; and a drive mechanism provided inside the housing and configured to move the reading unit reciprocatingly in the second direction, wherein: the carriage has a reference surface, a pair of supporting portions provided at two end sides in the first direction, and one end edge positioned on one side, with respect to the reference surface, in a second direction orthogonal to the first direction and parallel to the reference surface; the case has a pair of supported portions provided to correspond to the pair of supporting portions and configured to be supported swingably by the corresponding supporting portions, respectively; the case is configured to swing about a first axis being parallel to the first direction and positioned close to the one end edge, between a first position at which the case is inclined in a direction away from the reference surface, and a second position at which the case is positioned close to the reference surface, by the pair of supported portions being supported by the pair of supporting portions of the carriage; a positioning portion configured to position the case relative to the carriage in the first direction is provided between the carriage and the case; the positioning portion includes a projection provided on the carriage to project from the reference surface toward the case in a state that the case is at the second position, and a recess provided in the case and into which the projection of the carriage is fitted in the state that the case is at the second position; and the projection is formed with a first portion positioned at the side of the one end edge and set at such a height as to avoid interfering with the case in a state that the case is at the first position, and a second portion separated farther from the one end edge than the first portion in the second direction, having a height from the reference surface higher than that of the first portion, and configured to fit into the recess of the case in the state that the case is at the second position.

In the image reading apparatus according to the second aspect of the present invention, by the function and effect exerted by the reading unit according to the first aspect of the present invention, it is possible to suppress failure of the fit-in between the projection and the recess constituting the positioning portion due to some impact or the like, as well as to realize a thin body of the image reading apparatus.

DESCRIPTION OF THE PREFERRED EMBODIMENT

Hereinbelow, referring to the accompanying drawings, an embodiment embodying the present invention will be explained.

Figure 1:
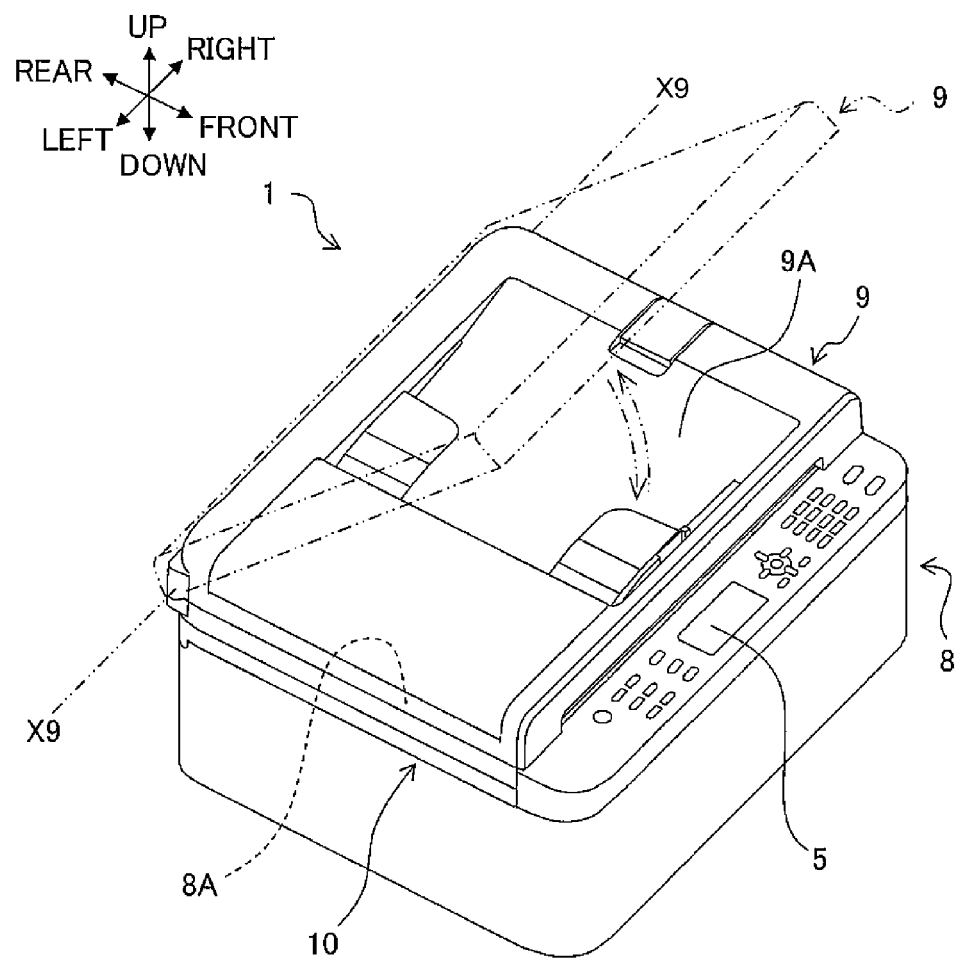
FIG. 1 is a perspective view of an image reading apparatus using a reading unit according to an embodiment of the present invention.
Figure 2:
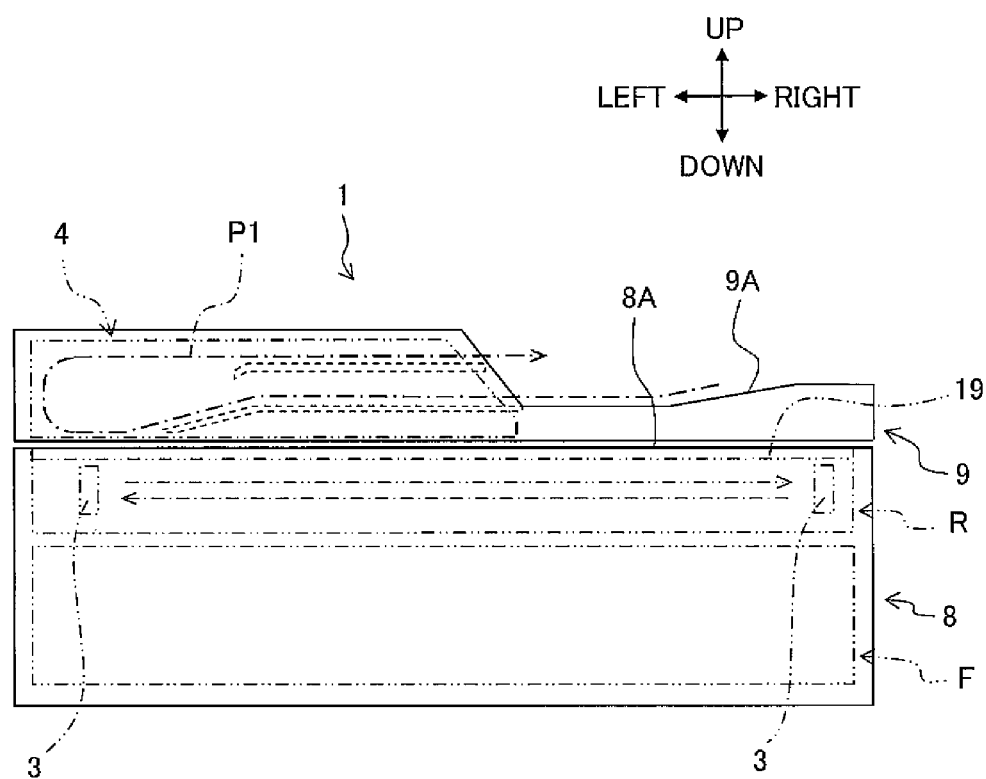
FIG. 2 is a schematic lateral view of the image reading apparatus.
Figure 3:
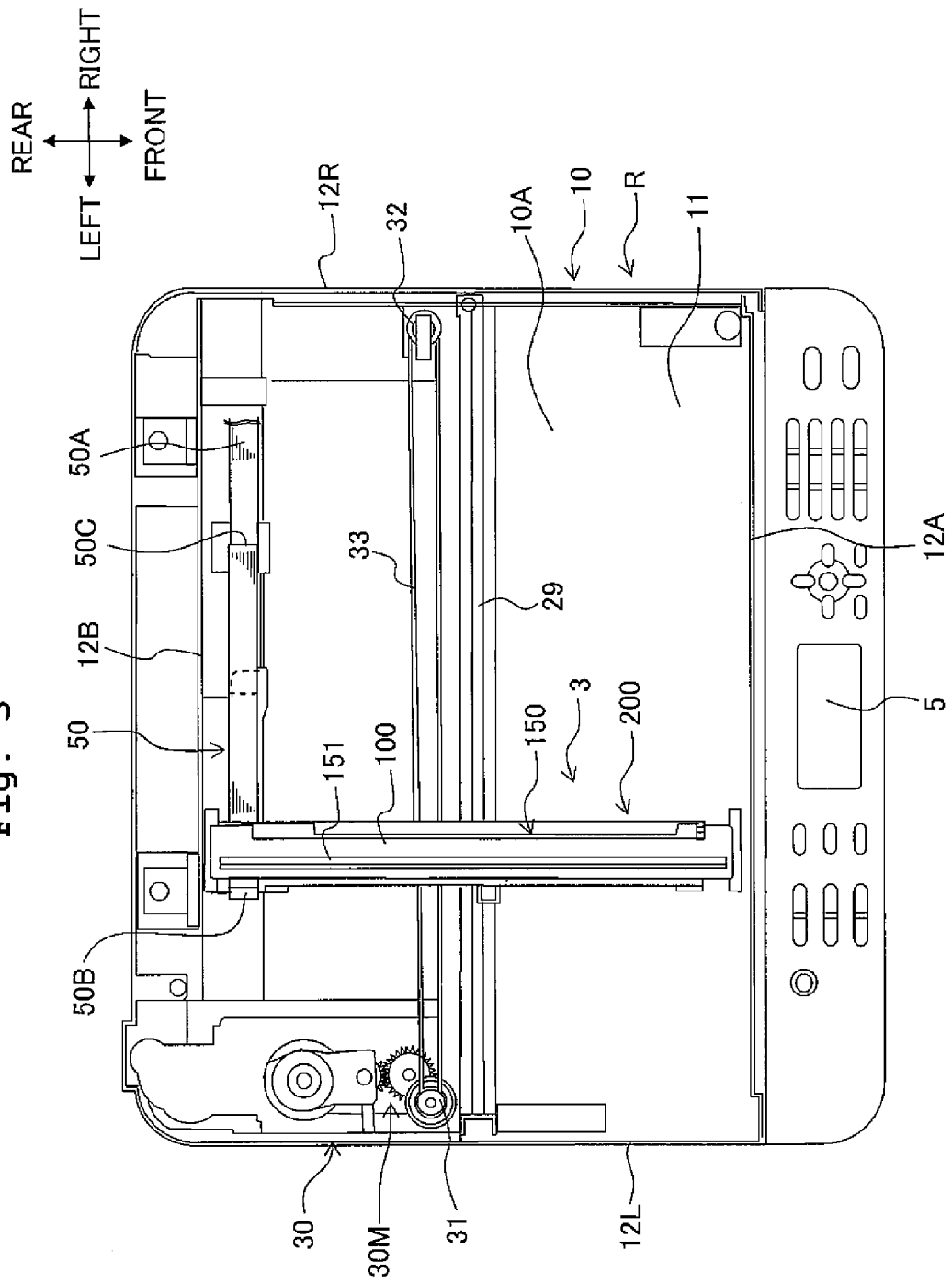
FIG. 3 is a top view of an image reading housing when a platen glass is removed.
Figure 4:
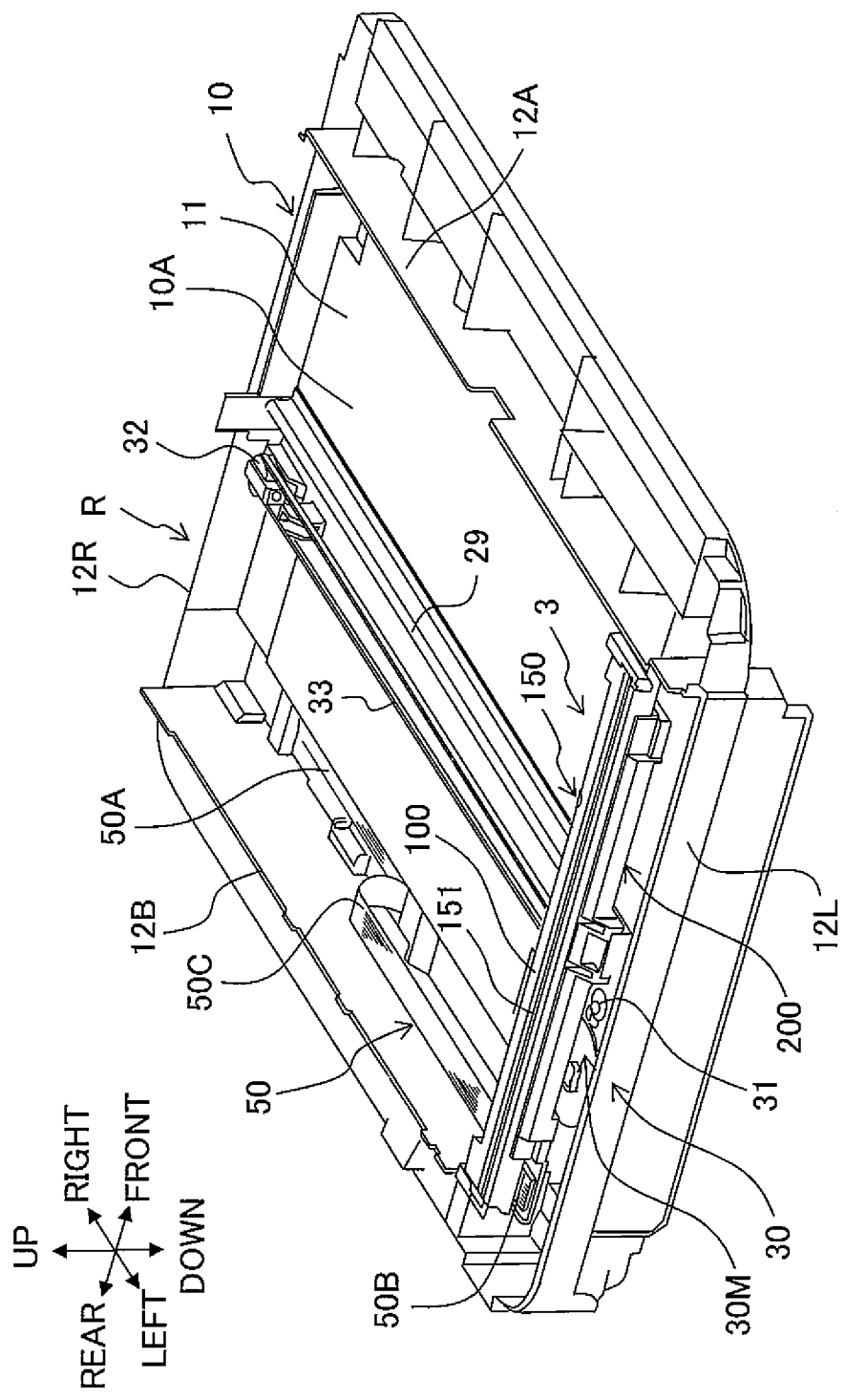
FIG. 4 is a perspective view showing a base unit, the reading unit, a drive mechanism, etc. of the image reading housing.

An image reading apparatus 1 of this embodiment shown in FIG. 1 is an example of a specific aspect of the image reading apparatus of the present invention. As shown in FIGS. 2 to 4, the image reading apparatus 1 includes a reading unit 3 which is an example of a specific aspect of the reading unit of the present invention. In FIG. 1, the side at which an operation panel 5 is provided is defined as the front side of the image reading apparatus 1, and the left hand side when facing the operation panel 5 is defined as the left side, so as to define the respective directions of front, rear, left, right, up, and down. Further, each drawing from FIG. 2 to FIG. 14 is illustrated based on the directions defined in FIG. 1. Hereinbelow, based on FIG. 1 and the like, each component included in the image reading apparatus 1 will be explained.

<General Configuration>

As shown in FIGS. 1 and 2, the image reading apparatus 1 includes a main body 8 and an opening and closing unit 9. The main body 8 has an approximately box-like planular shape, and the operation panel 5 shown in FIG. 1 is provided at the front side. As shown in FIG. 2, a platen glass 19 is arranged on the upper surface of the main body 8, and the upper surface of the platen glass 19 serves as a reading surface 8A extending almost horizontally. A manuscript is placed on the reading surface 8A for reading the manuscript in a standstill state. The manuscript means sheets of paper or the like, a book, etc. The platen glass 19 is an example of the "platen" of the present invention.

As shown in FIG. 1, by an unshown hinge arranged on the upper-end edge of the main body 8 on the rear surface side, the opening and closing unit 9 is supported by the main body 8 to be swingable about an opening and closing axis X9 extending in a left-right direction. As shown in FIG. 1 by solid line, when closed, the opening and closing unit 9 covers the reading surface 8A from above. On the other hand, as shown in FIG. 1 by two-dot chain line, when swinging about the opening and closing axis X9 such that a front side of the opening and closing unit 9 is displaced upward and rearward, the opening and closing unit 9 opens the upper side of the reading surface 8A. By virtue of this, a user is able to place the manuscript to be read on the reading surface 8A.

As shown in FIGS. 1 and 2, a supply tray 9A is provided on the upper side of the opening and closing unit 9. Further, as shown in FIG. 2, an automatic manuscript transport mechanism 4 is arranged inside the opening and closing unit 9. Because the automatic manuscript transport mechanism 4 is a well-known mechanism, any detailed explanation therefor will be omitted. The automatic manuscript transport mechanism 4 separates a plurality of sheets of the manuscript placed on the supply tray 9A one by one, and transports the separated sheets sequentially along a transport path P1.

An image forming housing F is provided in a lower portion of the main body 8. While illustration is omitted, the image forming housing F contains an image formation section of ink jet type, laser type, or the like. An image reading housing R is provided in an upper portion of the main body 8. As shown in FIGS. 2 to 4, the image reading housing R is constructed to have a base unit 10, the platen glass 19, an unshown frame, etc. The image reading housing R is an example of the "housing" of the present invention.

As shown in FIGS. 3 and 4, the base unit 10 is an injection-molded product formed of thermoplastic resin. The base unit 10 is formed with a bottom 11, peripheral walls 12A, 12B, 12L and 12R, etc.

The bottom 11 is an approximately rectangular plane extending almost horizontally. Further, in this embodiment, the expression "extending almost horizontally" may refer to a plane which includes, therein, some convex portions and/or concave portions, and/or includes inclination, curvature and/or flexure to a certain extent.

The peripheral walls 12A, 12B, 12L and 12R project upward from the end edges of the bottom 11 on the front, rear, left and right sides, respectively. The front peripheral wall 12A, rear peripheral wall 12B, left peripheral wall 12L, and right peripheral wall 12R enclose the periphery of the bottom 11 to form an installation space 10A therein. The reading unit 3, a drive mechanism 30, and a distributing cable 50 are installed in the installation space 10A.

The periphery of the platen glass 19 shown in FIG. 2 is supported by the front peripheral wall 12A, rear peripheral wall 12B, left peripheral wall 12L and right peripheral wall 12R shown in FIG. 3 and the like, from below. Further, the platen glass 19 is fixed to the image reading housing R by being fitted on the base unit 10 with the unshown frame being in contact with its own periphery from above. The platen glass 19 faces the bottom 11 across an interval while covering the installation space 10A.

A guide rail 29 is formed on the bottom 11. The guide rail 29 is positioned at the approximate center of the bottom 11 in a front-rear direction, and extends in the left-right direction while projecting upward. The left end of the guide rail 29 extends up to a lower part of the left peripheral wall 12L, while the right end of the guide rail 29 extends up to a lower part of the right peripheral wall 12R.

As shown in FIGS. 3 and 4, the reading unit 3 includes a carriage 200, and an image sensor 150.

The carriage 200 is a member made of resin and elongated in the front-rear direction, and extends up to the vicinity of the front peripheral wall 12A and up to the vicinity of the rear peripheral wall 12B. The front-rear direction is an example of the "first direction" of the present invention. Guided by the guide rail 29, the carriage 200 is able to move reciprocatingly from the left-end side to the right-end side of the bottom 11.

The image sensor 150 is supported by the carriage 200 to face the platen glass 19 from below within the installation space 10A. A specific configuration for the carriage 200 to support the image sensor 150 will be explained later in detail.

The image sensor 150 has a case 100 extending in the front-rear direction, and a plurality of light receiving elements 151 contained in the case 100. In FIGS. 3 and 4, the reference numeral 151 is assigned to the aggregate of the plurality of light receiving elements 151. Each of the light receiving elements 151 is a well-known image reading sensor such as a CIS (Contact Image Sensor), CCD (Charge Coupled Device), or the like. The light receiving elements 151 are aligned linearly in the front-rear direction. In the front-rear direction, the light receiving elements 151 as a whole are as long as to the extent of exceeding the front-rear width of the manuscript placed on the reading surface 8A (the manuscript of the maximum size readable by this apparatus). The image sensor 150 moves reciprocatingly along with the movement of the carriage 200 from the left-end side to the right-end side of the bottom 11.

The drive mechanism 30 has a drive source 30M, a driving pulley 31, a driven pulley 32, and a timing belt 33.

The drive source 30M is composed of an electric motor and a plurality of gear groups engaging with the electric motor. The drive source 30M is positioned adjacent to the left peripheral wall 12L and on the rear side of the left end of the guide rail 29. The drive source 30M is controlled and caused to rotate by an unshown control section.

The driving pulley 31 is formed integrally with the frontmost gear among the gear groups of the drive source 30M. The driving pulley 31 is positioned adjacent to the left peripheral wall 12L, and on the rear side of the left end of the guide rail 29. The driving pulley 31 is rotatable about an axis extending in an up-down direction.

If the unshown control section controls and causes the electric motor of the drive source 30M to rotate, then the driving pulley 31 is driven to rotate. The control section switches the rotation direction of the electric motor to cause the driving pulley 31 to rotate positively or negatively.

The driven pulley 32 is positioned adjacent to the right peripheral wall 12R and on the rear side of the right end of the guide rail 29. The driven pulley 32 is rotatable about another axis extending in the up-down direction.

The timing belt 33 is an endless belt wound around the driving pulley 31 and driven pulley 32. Although illustration is omitted, the timing belt 33 is connected to the carriage 200 in one of a pair of the linear portions extending in parallel from the driving pulley 31 to the driven pulley 32. By virtue of this, the displacement of the timing belt 33 along with the positive rotation or negative rotation of the driving pulley 31 is transmitted to the carriage 200 so as to cause the carriage 200 to move reciprocatingly in the left-right direction.

The distributing cable 50 is a flexible flat cable having a plurality of covered electric wires connected in a belt-like shape. The distributing cable 50 is arranged on the rear-end side of the bottom 11. One end portion 50A of the distributing cable 50 is connected electrically to the unshown control section provided in the main body 8. Another end portion 50B of the distributing cable 50 is fixed on the carriage 200, and connected electrically with the image sensor 150 via a connector 100C. The distributing cable 50 is configured to have a slack 50C capable of following the movement of the carriage 200 so as not to hinder the image reading process by the image sensor 150.

<Image Reading Operation>

When the image reading apparatus 1 reads the manuscript placed on the reading surface 8A, the drive mechanism 30 operates, as shown in FIG. 2, to move the image sensor 150 mounted on the carriage 200 from the left-end side to the right-end side inside the main body 8. By virtue of this, the respective light receiving elements 151 of the image sensor 150 read the images of the manuscript placed on the reading surface 8A. After that, the drive mechanism 30 causes the image sensor 150 finished with the reading to move from the right-end side to the left-end side inside the main body 8 to return to its original position.

Further, when the image reading apparatus 1 reads the images of a plurality of sheets of the manuscript placed on the supply tray 9A, as shown in FIGS. 2 and 4, the drive mechanism 30 operates to move the image sensor 150 mounted on the carriage 200 to a fixed reading position on the left-end side inside the main body 8. Then, if the automatic manuscript transport mechanism 4 sequentially transports the sheets of the manuscript placed on the supply tray 9A along the transport path P1, then the sheets of the manuscript pass above the image sensor 150 at the fixed reading position, so as to let the respective light receiving elements 151 of the image sensor 150 read the images of the manuscript passing above.

In this manner, the image reading apparatus 1 is able to read the images of the manuscript placed either on the reading surface 8A or in the supply tray 9A.

<Specific Configuration in Which the Image Sensor is Supported by the Carriage>

Figure 8:
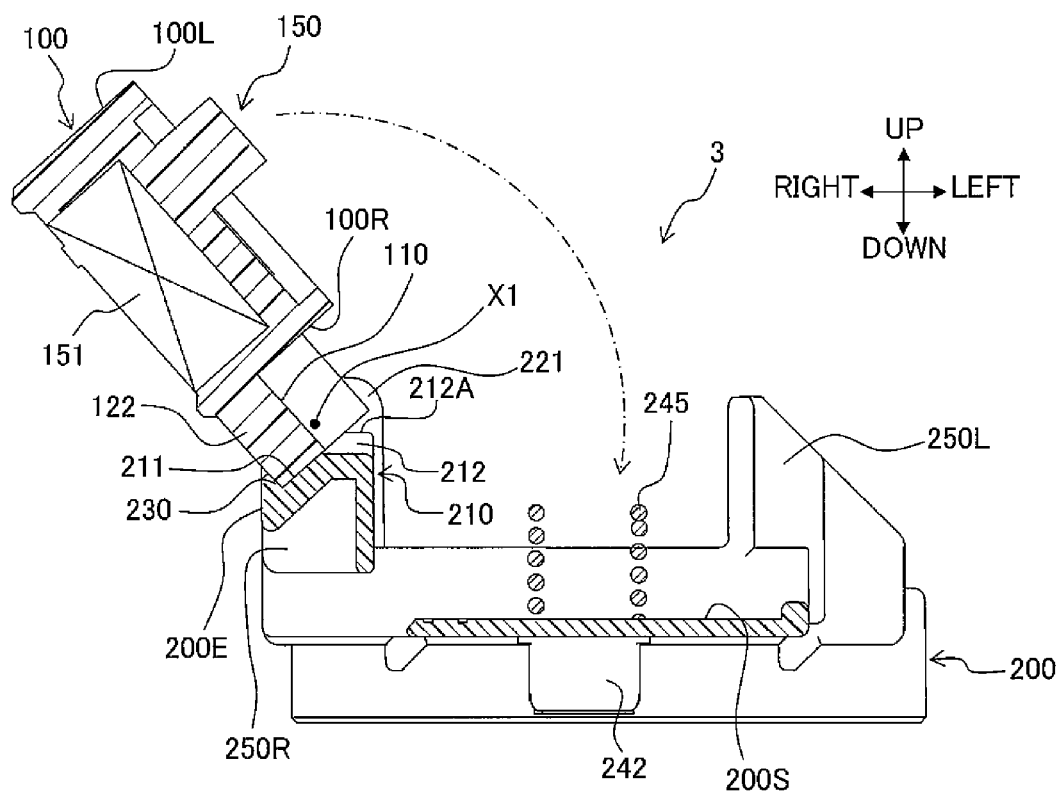
FIG. 8 is a cross-sectional view of the carriage, and a case at a first position taken along the line VII-VII of FIG. 6.
Figure 9:
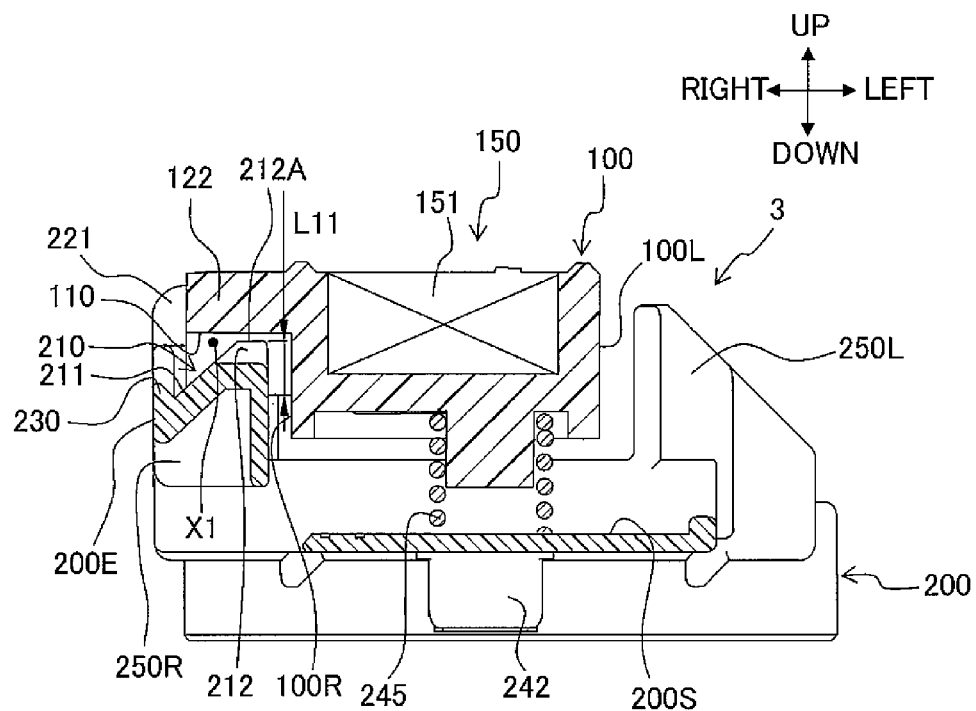
FIG. 9 is a cross-sectional view of the carriage, the case at a second position, and springs being compressed taken along the line VII-VII of FIG. 6.
Figure 10:
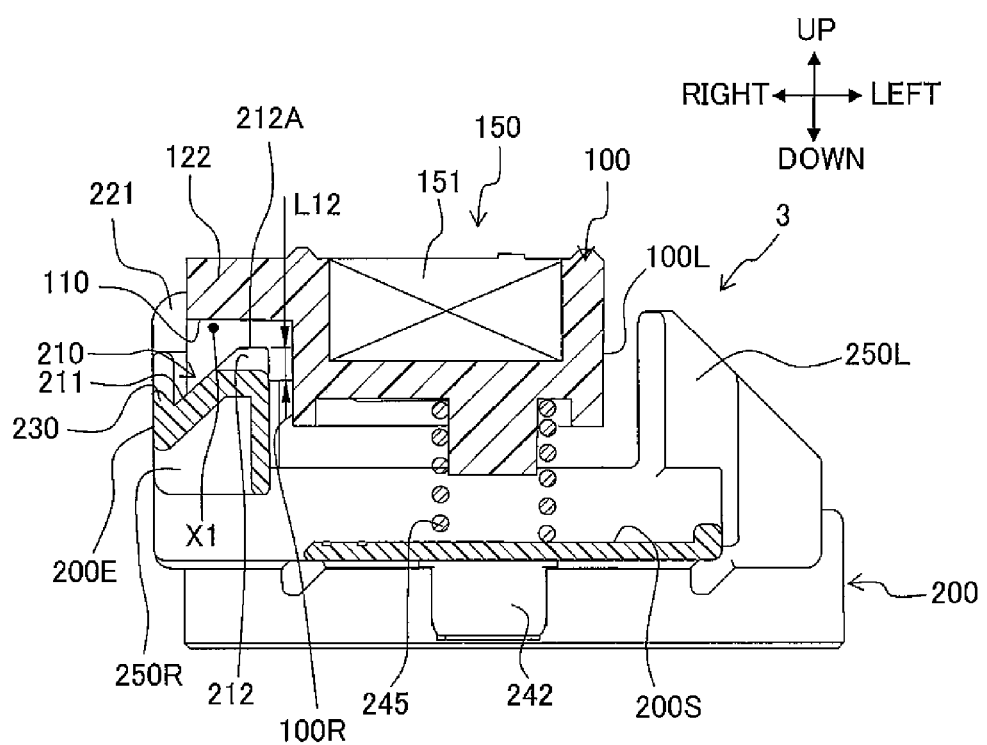
FIG. 10 is a cross-sectional view of the carriage, the case at the second position, and the springs being expanded taken along the line VII-VII of FIG. 6.

As explained below, the image sensor 150 is installed on the carriage 200 according to the procedure shown in FIGS. 5 to 8 to be supported by the carriage 200 as shown in FIGS. 9 and 10.

Figure 5:
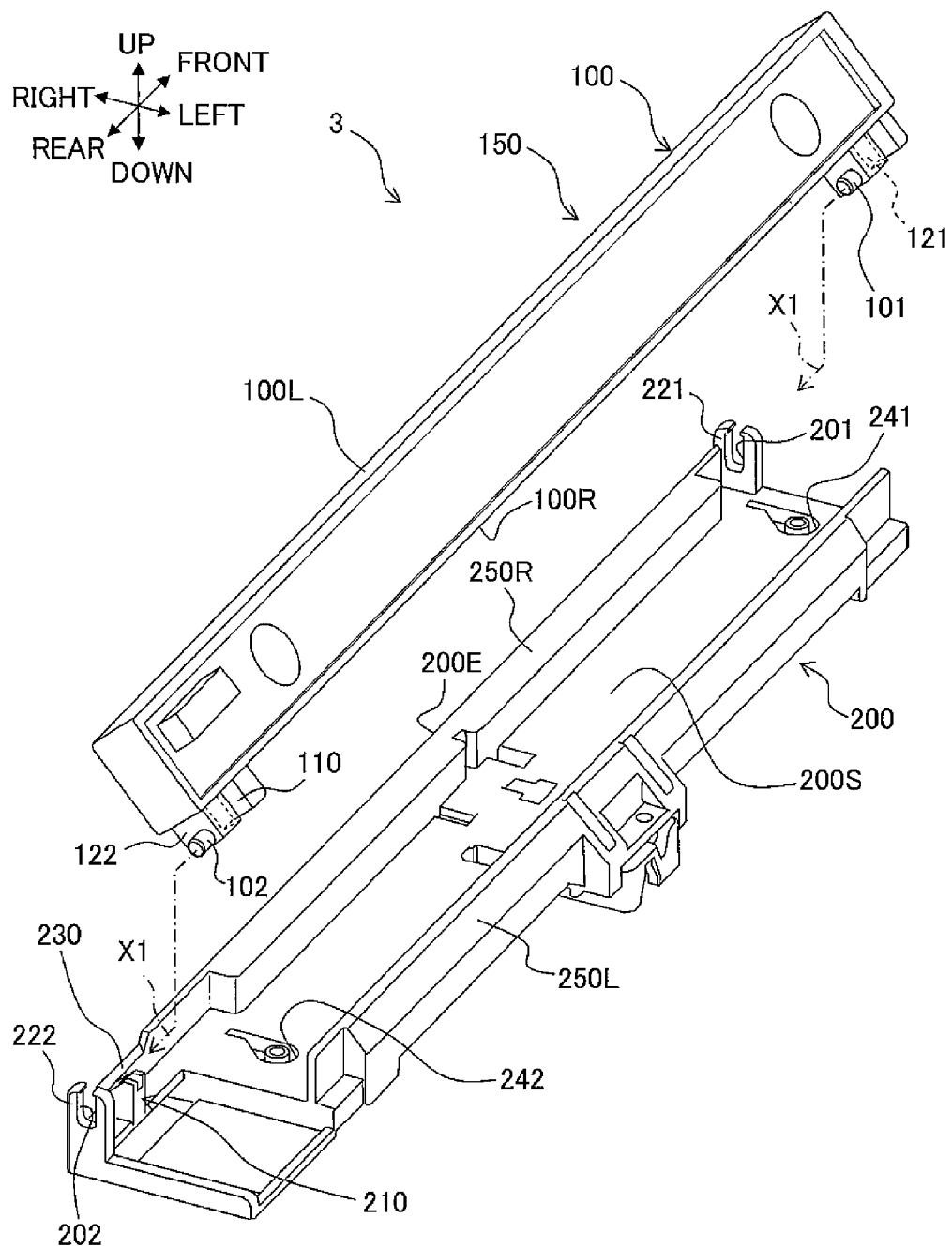
FIG. 5 is an exploded perspective view of the reading unit.
Figure 7:
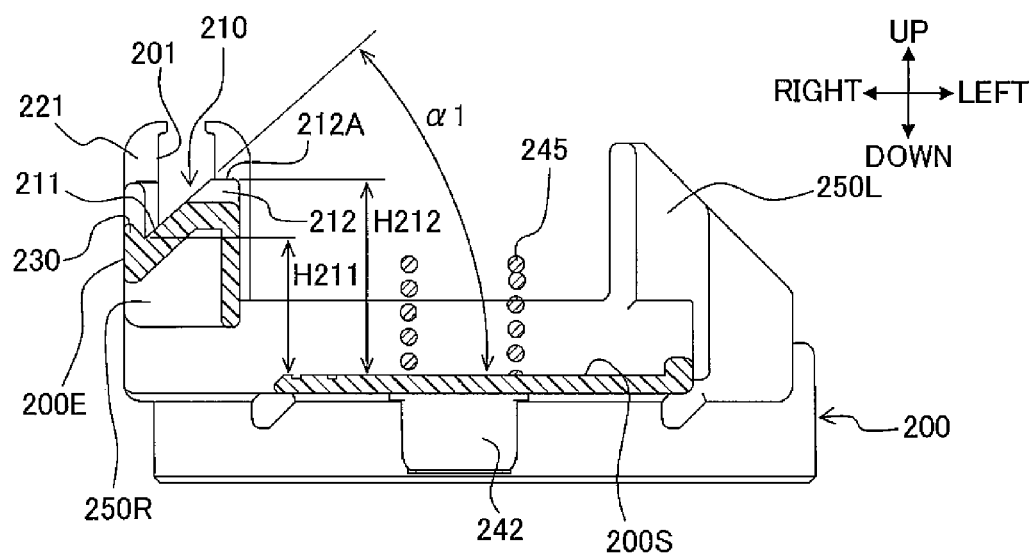
FIG. 7 is a cross-sectional view of the carriage taken along the line VII-VII of FIG. 6.

As shown in FIGS. 5 and 7, the carriage 200 has a reference surface 200S. Parallel to the reading surface 8A, the reference surface 200S extends long in the front-rear direction and extends short in the left-right direction. The left-right direction is an example of the "second direction orthogonal to the first direction and parallel to the reference surface".

Further, the carriage 200 has a left wall portion 250L, a right wall portion 250R, and a right end edge 200E. The left wall portion 250L projects upward from the left end edge of the reference surface 200S and extends in the front-rear direction. The right wall portion 250R projects upward from the right end edge of the reference surface 200S and extends in the front-rear direction. The left wall portion 250L and the right wall portion 250R reinforce the reference surface 200S to prevent the same from being distorted. Then, by the recess formed by the reference surface 200S, left wall portion 250L and right wall portion 250R, the image sensor 150 is covered from below.

The right end edge 200E is the right lateral surface of the right wall portion 250R. The right end edge 200E is positioned on the right side of the reference surface 200S. The right end edge 200E is an example of the "one end edge of the carriage" of the present invention. Further, while the right lateral surface of the right wall portion 250R is orthogonal to the reference surface in this embodiment, if the right lateral surface of the right wall portion 250R is, for example, a flexed surface or curved surface swelling out rightward, then the rightmost ridge line of that flexed surface or curved surface corresponds to an example of the "one end edge of the carriage" of the present invention.

Further, the carriage 200 has plate-like support portions 221 and 222, and shaft holes 201 and 202. The support portion 221 projects upward in a plate-like form from the front-end side of the right wall portion 250R. The support portion 222 projects upward in a plate-like form from the rear-end side of the right wall portion 250R.

The shaft hole 201 is a long hole formed in the support portion 221 on the front side. The shaft hole 201 penetrates through the support portion 221 in the front-rear direction. The shaft hole 201 extends long in the up-down direction and its upper portion is a cutaway. The shaft hole 202 is a long hole formed in the support portion 222 on the rear side. The shaft hole 202 penetrates through the support portion 222 in the front-rear direction. The shaft hole 202 extends long in the up-down direction and its upper portion is a cutaway. The contours of the shaft hole 201 and the shaft hole 202 are consistent with each other as viewed from the front-rear direction. The shaft hole 201 and the shaft hole 202 define a first axis X1 close to the right end edge 200E along the front-rear direction. The first axis X1 may move in the up-down direction within the area of the long-hole shape of the shaft hole 201 and shaft hole 202. The support portions 221 and 222, and shaft holes 201 and 202 are an example of the "pair of support portions" of the present invention.

Further, the carriage 200 has spring receiving portions 241 and 242. The spring receiving portion 241 dents downward on the front-end side of the reference surface 200S. The spring receiving portion 242 dents downward on the rear-end side of the reference surface 200S. As shown in FIG. 7, each of the spring receiving portions 241 and 242 holds a compression coil spring 245 by inserting the lower end of the compression coil spring 245 thereinto.

As shown in FIG. 5, the case 100 has swell-out portions 121 and 122, and shaft portions 101 and 102. As shown in FIG. 9, the case 100 has a left lateral surface 100L facing to the left side, and a right lateral surface 100R facing to the right side in a state of being supported by the carriage 200. As shown in FIG. 5, the swell-out portion 121 swells out in a block-like form from the right lateral surface 100R of the case 100 on the front-end side toward a side opposite to the left lateral surface 100L. The swell-out portion 122 swells out in a block-like form from the right lateral surface 100R of the case 100 on the rear-end side toward the side opposite to the left lateral surface 100L.

The shaft portion 101 projects rearward from the rear lateral surface of the swell-out portion 121 on the front side. The shaft portion 102 projects rearward from the rear lateral surface of the swell-out portion 122 on the rear side. The contours of the shaft portion 101 and the shaft portion 102 are consistent with each other as viewed from the front-rear direction. The interval between the shaft portion 101 and the shaft portion 102 in the front-rear direction is approximately equal to the interval between the shaft hole 201 and the shaft hole 202 in the front-rear direction. That is, the shaft portion 101 is provided at a position corresponding to the shaft hole 201, while the shaft portion 102 is provided at a position corresponding to the shaft hole 202. The shaft portions 101 and 102 are an example of the "pair of supported portions" of the present invention.

Figure 6:
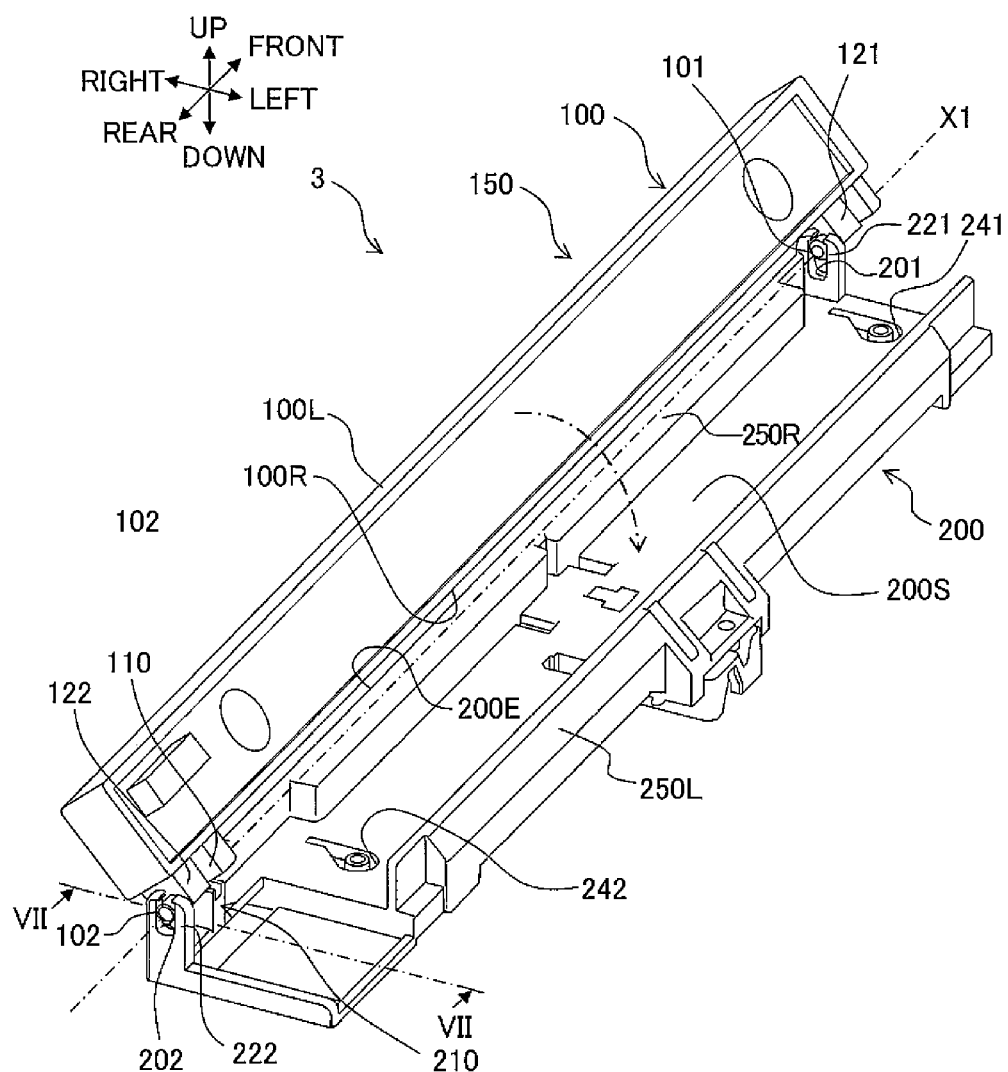
FIG. 6 is a perspective view showing a halfway state of fitting an image sensor to a carriage.

As shown in FIG. 5, after causing the image sensor 150 to approach the carriage 200 from the state of deviating upward and frontward with respect to the reference surface 200S of the carriage 200, and causing the shaft portions 101 and 102 to conform with the first axis X1, by drawing the image sensor 150 rearward, as shown in FIGS. 6 and 8, the shaft portion 101 is supported swingably by the shaft hole 201 while the shaft portion 102 is supported swingably by the shaft hole 202.

At the position shown in FIG. 6 and in FIG. 8, the case 100 is inclined in a direction away from the reference surface 200S. In particular, the case 100 is swung 130 to 150 degrees or so about the first axis X1 with respect to the reference surface 200S. The position of the case 100 shown in FIG. 6 and in FIG. 8 is defined as a first position.

Then, as shown in FIG. 9 and in FIG. 10, by swinging the case 100 about the first axis X1 from the first position, the case 100 approaches the reference surface 200S. As a result, the case 100 is positioned right above the reference surface 200S to contact with the upper ends of the compression coil springs 245. The position of the case 100 shown in FIG. 9 and in FIG. 10 is defined as a second position.

By upward and downward motions of the shaft portions 101 and 102 and the first axis X1 along the shaft holes 201 and 202 which are long holes, the case 100 at the second position is, as shown in FIGS. 9 and 10, enabled to move upward and downward. The case 100 is biased upward by the compression coil springs 245 to be pressed against the platen glass 19, thereby maintaining a constant distance between the respective light receiving elements 151 and the reading surface 8A.

As shown in FIGS. 5 and 7, the carriage 200 is provided with a projection 210. As shown in FIG. 5, the case 100 is provided with a recess 110. The projection 210 and the recess 110 are provided for positioning the case 100 with respect to the carriage 200 in the front-rear direction. The projection 210 and recess 110 are an example of the "positioning portion provided between the carriage and the case" of the present invention.

The projection 210 projects upward from the reference surface 200S on its rear-end side and on the front side of the support portion 222 and shaft hole 202. In other words, as shown in FIGS. 9 and 10, the projection 210 projects toward the swell-out portion 122 on the rear side of the case 100 at the second position.

As shown in FIG. 7, the projection 210 is formed with a relief portion 211 (an example of the first portion of the present invention) and a fit-in portion 212 (an example of the second portion of the present invention).

The relief portion 211 is positioned at the side of the right end edge 200E in the projection 210. The fit-in portion 212 is separated from the right end edge 200E farther than the relief portion 211 in the left-right direction. That is, the fit-in portion 212 is positioned at the left side of the relief portion 211.

The relief portion 211 and the fit-in portion 212 are inclined such that the height, of each of the relief portion 211 and the fit-in portion 212, from the reference surface 200S increases in an approximately linear fashion toward a side away from the right end edge 200E in the left-right direction. Further, the fit-in portion 212 has a flat leading end 212A.

The relief portion 211 and fit-in portion 212 have an inclination angle $\alpha 1$ of 40 to 60 degrees or so with respect to the reference surface 200S. The height H211 of the lower end of the relief portion 211 from the reference surface 200S is set to be less than the height of the lower ends of the shaft holes 201 and 202 from the reference surface 200S. The height H212 of the leading end 212A of the fit-in portion 212 from the reference surface 200S is set to be greater than the height of the relief portion 211 from the reference surface 200S. By setting such a height of the relief portion 211, as shown in FIGS. 6 and 8, the relief portion 211 can avoid interfering with the swell-out portion 122 on the rear side of the case 100 at the first position.

As shown in FIGS. 5 and 7, the projection 210 is formed with a rib 230. The rib 230 is provided adjacent to the lower end of the relief portion 211 from the right side while extending along the front-rear direction. The rib 230 is an example of the "restraint portion" of the present invention. As shown in FIG. 8, the rib 230 restrains the case 100 from swinging about the first axis X1 from the first position to the opposite side from the second position by way of being adjacent to the relief portion 211 from a side opposite to the fit-in portion 212, and contacting with the swell-out portion 122 on the rear side.

As shown in FIG. 8, the recess 110 is provided to dent at the lower surface side of the swell-out portion 122 on the rear side. That is, the recess 110 dents from a side opposite to the surface of the case 100 at the side of containing the respective light receiving elements 151, toward the surface of the case 100 at the side of containing the respective light receiving elements 151. Further, the recess 110 is open on a side opposite to the right lateral surface 100R.

As shown in FIGS. 6 and 8, in a state that the case 100 is at the first position, the recess 110 is positioned above the fit-in portion 212. Then, as shown in FIGS. 9 and 10, by swinging the case 100 about the first axis X1 from the first position, the recess 110 turns to draw an upward arc about the first axis X1. As a result, in a state that the case 100 is at the second position, the fit-in portion 212 is fitted in the recess 110. The width of the fit-in portion 212 in the front-rear direction is set to such a size as not to bring about any interspace for the inner width of the recess 110 in the front-rear direction. By virtue of this, the case 100 is positioned with respect to the carriage 200 in the front-rear direction.

In this manner, the reading unit 3 is constructed by the image sensor 150 being supported by the carriage 200.

As shown in FIGS. 9 and 10, if the case 100 at the second position moves upward and downward, then the length of fitting of the fit-in portion 212 in the recess 110 ranges from L11 to L12. This range is determined by the movable length of the shaft portions 101 and 102 moving within the shaft holes 201 and 202 which are long holes. This shows, namely, that even if the fit-in length is shortened by the motion of the shaft portions 101 and 102, the fit-in length L12 is still secured.

Here, a reading unit of a comparative example is shown in FIGS. 11 to 14. The reading unit of the comparative example adopts a projection 219 which has modified the shape of the projection 210 of the reading unit 3 of the above embodiment. The reading unit of the comparative example is the same as the reading unit 3 of the above embodiment in terms of the other configurations. Hence, the same reference numerals are assigned to the components of the same configurations as those of the reading unit 3 of the above embodiment, any explanation of which will be omitted.

Figure 11:
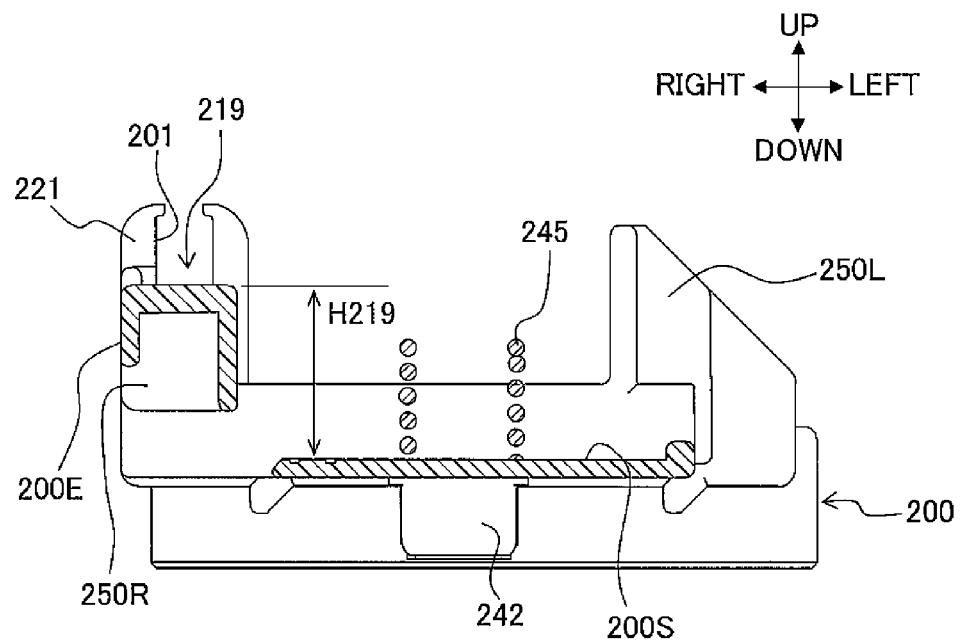
FIG. 11 is a diagram showing a reading unit of a comparative example and corresponding to FIG. 7.

As shown in FIG. 11, in the reading unit of the comparative example, the projection 219 has a flat shape at an equal height from the reference surface 200S in the left-right direction. The height H219 of the projection 219 from the reference surface 200S is set to be less than the height H212 of the leading end 212A of the fit-in portion 212 from the reference surface 200S in the above embodiment, but greater than the height H211 of the lower end of the relief portion 211 from the reference surface 200S.

Figure 12:
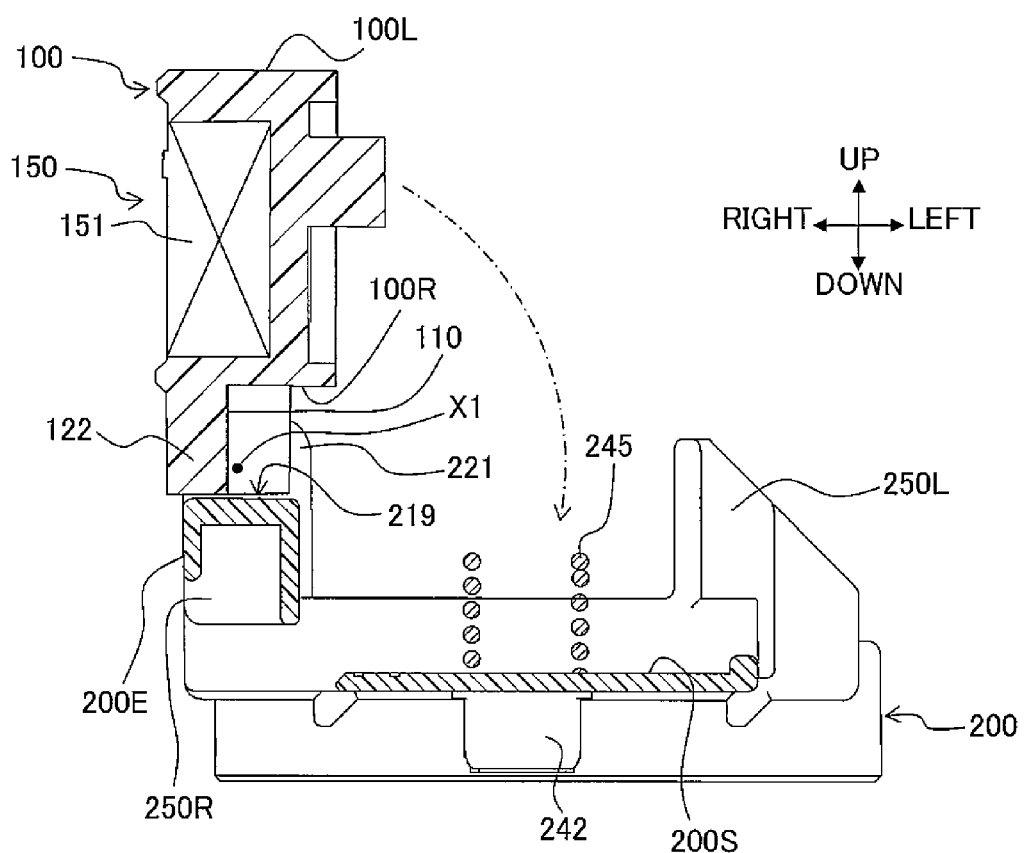
FIG. 12 is a diagram showing the reading unit of the comparative example and corresponding to FIG. 8.

In order to avoid interfering with the projection 219 in such a shape, in the comparative example as shown in FIG. 12, the case 100, being at the first position, is swung about the first axis X1 by 90 degrees or so with respect to the reference surface 200S.

Figure 13:
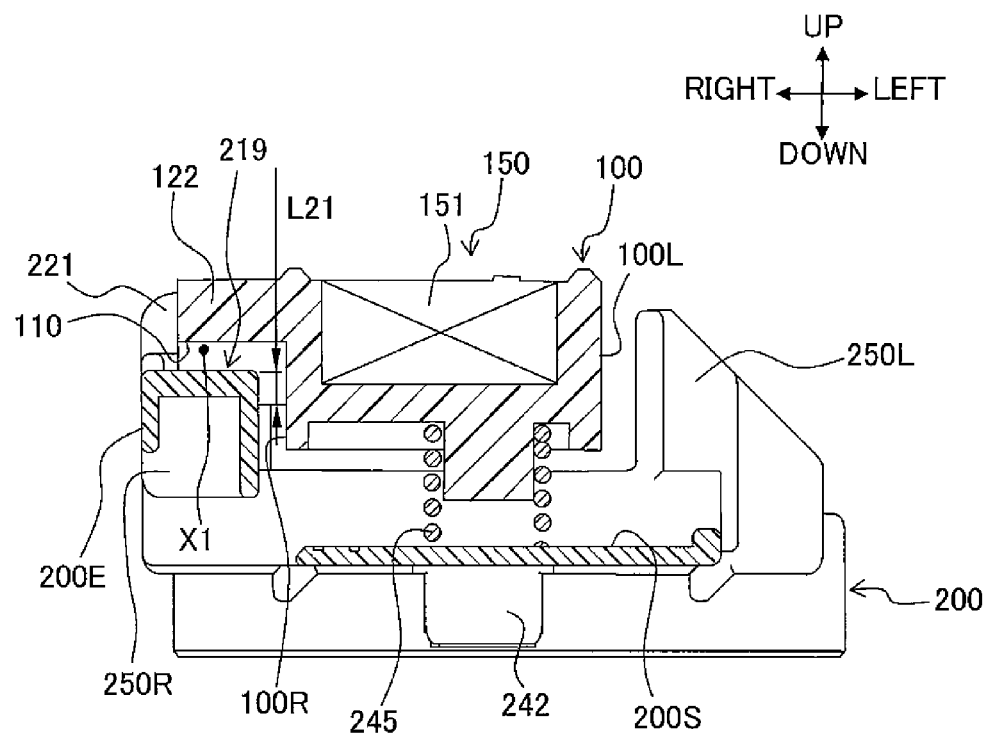
FIG. 13 is a diagram showing the reading unit of the comparative example and corresponding to FIG. 9.
Figure 14:
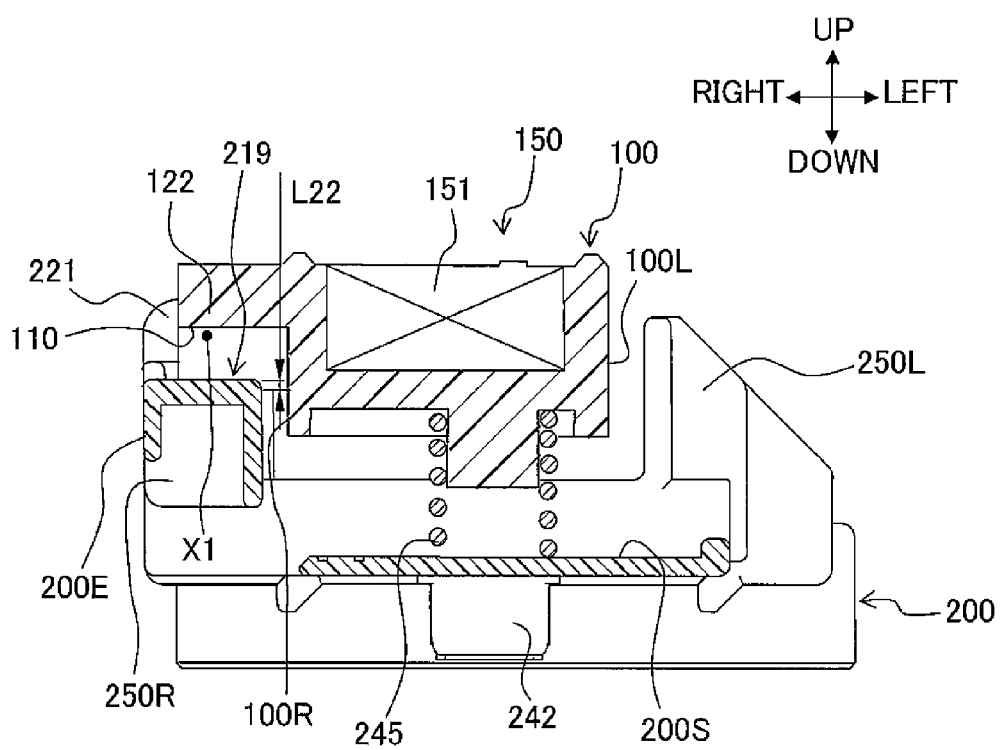
FIG. 14 is a diagram showing the reading unit of the comparative example and corresponding to FIG. 10.

Then, by swinging the case 100 about the first axis X1 from the first position, as shown in FIGS. 13 and 14, the recess 110 turns to draw a ¼ arc about the first axis X1. As a result, in a state that the case 100 is at the second position, the projection 219 is fitted in the recess 110. By virtue of this, the case 100 is positioned with respect to the carriage 200 in the front-rear direction.

In the comparative example as shown in FIGS. 13 and 14, if the case 100 at the second position moves upward and downward, then the length of fitting of the projection 219 in the recess 110 ranges from L21 to L22 which is narrower than L11 to L12 of the above embodiment. This shows, in the comparative example, that if the fit-in length is shortened by the motion of the shaft portions 101 and 102, then the fit-in length is secured no more than L22. Therefore, if some impact or the like acts when the fit-in length is L22, for example, the image sensor 150 may move to deviate from the carriage 200 in the front-rear direction, thereby increasing the possibility of failing the fit-in. In contrast to this, by the configuration shown in FIGS. 9 and 10 in the above embodiment, even if the fit-in length is shortened by the motion of the shaft portions 101 and 102, the fit-in length L12 greater than L22 is still secured. Hence, the possibility of failing the fitting of the projection 210 in the recess 110 becomes lower than that in the comparative example.

<Function and Effect>

In the reading unit 3 used in the image reading apparatus 1 of the above embodiment, the projection 210 and recess 110 function as a positioning portion to position the case 100 with respect to the carriage 200 in the front-rear direction. Therefore, it is possible to suppress fluctuation of precision in positioning the carriage 200 and the respective light receiving elements 151 of the image sensor 150 in the front-rear direction. As a result, it is possible to restrain reduction of the image reading quality of the reading unit 3.

Here, in the image reading apparatus 1 of the above embodiment, as shown in FIG. 7, the projection 210 is provided with the relief portion 211 and the fit-in portion 212. Then, the relief portion 211 is positioned at the side of the right end edge 200E, and set at the height (H211) to avoid interfering with the rear-side swell-out portion 122 of the case 100 at the first position. On the other hand, the fit-in portion 212 is positioned farther from the right end edge 200E of the carriage 200 than the relief portion 211 in the left-right direction, and formed such that the height (H212) of the fit-in portion 212 is higher than that of the relief portion 211. By virtue of this, as shown in FIGS. 6 and 8, it is possible to cause the rear-side swell-out portion 122 of the case 100 at the first position to contact with the relief portion 211 without interfering with the fit-in portion 212. In this case, it is possible to increase the angle between the first position and the second position, thereby enabling the shaft holes 201 and 202 to support the shaft portions 101 and 102 at the first position without raising the position of the shaft holes 201 and 202 over the conventional position. Further, by swinging the case 100 from the first position to the second position to fit the fit-in portion 212 into the recess 110, it is possible to largely secure the fitting length from L11 to L12 between the fit-in portion 212 of the carriage 200 and the recess 110 of the image sensor 150 at the second position, by raising only the height H212 of the fit-in portion 212 but not raising the height of the entire projection 210. As a result, in the reading unit 3, even if some impact or the like acts to separate the case 100 of the image sensor 150 from the reference surface 200S of the carriage 200, it is still less likely to fail the fit-in between the two members.

Therefore, it is possible for the reading unit 3 of the above embodiment to realize a thin body of the unit while carrying out a high-precision positioning of the image sensor 150 with respect to the carriage 200 in the front-rear direction. As a result, by the function and effect exerted by the reading unit 3, it is also possible for the image reading apparatus 1 of the above embodiment to realize a thin body while carrying out a high-precision positioning of the image sensor 150 with respect to the carriage 200 in the front-rear direction.

Further, in the reading unit 3 of the above embodiment, the relief portion 211 and the fit-in portion 212 are inclined such that the height, of each of the relief portion 211 and the fit-in portion 212, from the reference surface 200S increases toward the side away from the right end edge 200E in the left-right direction. By virtue of this, in the reading unit 3 of the above embodiment, because the fit-in portion 212 is reinforced by the relief portion 211, the fit-in portion 212 is less liable to breakage as compared with the case in which only the fit-in portion 212 projects high.

Further, in the reading unit 3 of the above embodiment, the pair of supported portions are the shaft portions 101 and 102 projecting in the front-rear direction. Further, the pair of supporting portions are the shaft holes 201 and 202 provided in the support portions 221 and 222 to respectively contain the corresponding shaft portions 101 and 102. By virtue of this, it is easier to miniaturize the case 100 of the reading unit 3 as compared with the case in which the pair of supporting portions are shaft portions while the pair of supported portions are shaft holes.

Further, in the reading unit 3 of the above embodiment, because the leading end 212A of the fit-in portion 212 is flat, the fit-in portion 212 is less liable to breakage as compared with the case in which the leading end of the fit-in portion 212 is sharpened.

Further, in the reading unit 3 of the above embodiment, the case 100 of the image sensor 150 is positioned about the first axis X1 so as not to deviate from the first position by the rib 230 which is provided adjacent to the relief portion 211 and extending along the front-rear direction. Therefore, it is easy to carry out the work of causing the shaft holes 201 and 202 to support the shaft portions 101 and 102. Further, by virtue of the rib 230 of a simple construction, it is easy to form the restraint portion.

While the present invention was explained above in accordance with the embodiment, the present invention is not limited to the embodiment described above but, needless to say, is changeable appropriately in application without departing from the scope and spirit thereof For example, if the pair of supporting portions or the pair of supported portions are shaft holes, then the shaft holes may be bottom-closed holes, through holes, circular holes, long holes, etc. Further, part of each of the holes may be cut away.

Further, the recess may also be, for example, a groove, bottom-closed hole, through hole, circular hole, long hole, cutaway, etc.

What is claimed is:

1. A reading unit comprising:
    a carriage extending in a first direction; and
    an image sensor configured to be supported by the carriage, and having a case which extends in the first direction and a plurality of light receiving elements which are contained in the case and arranged in the first direction,
    wherein: the carriage has a reference surface, a pair of supporting portions provided at two end sides in the first direction, and one end edge positioned on one side, with respect to the reference surface, in a second direction orthogonal to the first direction and parallel to the reference surface;
    the case has a pair of supported portions provided to correspond to the pair of supporting portions and configured to be supported swingably by the corresponding supporting portions, respectively;
    the case is configured to swing about a first axis being parallel to the first direction and positioned close to the one end edge, between a first position at which the case is inclined in a direction away from the reference surface, and a second position at which the case is positioned close to the reference surface, by the pair of supported portions being supported by the pair of supporting portions of the carriage;

a positioning portion configured to position the case relative to the carriage in the first direction is provided between the carriage and the case;

the positioning portion comprises a projection provided on the carriage to project from the reference surface toward the case in a state that the case is at the second position, and a recess provided in the case and into which the projection of the carriage is fitted in the state that the case is at the second position; and the projection is formed with a first portion positioned at the side of the one end edge and set at such a height as to avoid interfering with the case in a state that the case is at the first position, and a second portion separated farther from the one end edge than the first portion in the second direction, having a height from the reference surface higher than that of the first portion, and configured to fit into the recess of the case in the state that the case is at the second position.

2. The reading unit according to claim 1, wherein the first portion is inclined such that the height of the first portion from the reference surface increases toward a side away from the one end edge in the second direction, and the second portion is inclined such that the height of the second portion from the reference surface increases toward the side away from the one end edge in the second direction.

3. The reading unit according to claim 1, wherein the pair of supported portions are shaft portions projecting in the first direction, and the pair of supporting portions are shaft holes containing the corresponding shaft portions.

4. The reading unit according to claim 1, wherein the second portion has a flat leading end.

5. The reading unit according to claim 1, wherein the projection is formed with a restraint portion adjacent to the first portion from a side opposite to the second portion to restrain the case from swinging about the first axis from the first position to a side opposite to the second position.

6. The reading unit according to claim 5, wherein the restraint portion is a rib provided adjacent to the first portion and extending along the first direction.

7. An image reading apparatus comprising:

a carriage extending in a first direction;

an image sensor configured to be supported by the carriage, and having a case which extends in the first direction and a plurality of light receiving elements which are contained in the case and arranged in the first direction;

a housing configured to support a platen and accommodate the reading unit below the platen; and a drive mechanism provided inside the housing and configured to move the reading unit reciprocatingly in the second direction, wherein: the carriage has a reference surface, a pair of supporting portions provided at two end sides in the first direction, and one end edge positioned on one side, with respect to the reference surface, in a second direction orthogonal to the first direction and parallel to the reference surface;

the case has a pair of supported portions provided to correspond to the pair of supporting portions and configured to be supported swingably by the corresponding supporting portions, respectively;

the case is configured to swing about a first axis being parallel to the first direction and positioned close to the one end edge, between a first position at which the case is inclined in a direction away from the reference surface, and a second position at which the case is positioned close to the reference surface, by the pair of supported portions being supported by the pair of supporting portions of the carriage;

a positioning portion configured to position the case relative to the carriage in the first direction is provided between the carriage and the case;

the positioning portion comprises a projection provided on the carriage to project from the reference surface toward the case in a state that the case is at the second position, and a recess provided in the case and into which the projection of the carriage is fitted in the state that the case is at the second position; and the projection is formed with a first portion positioned at the side of the one end edge and set at such a height as to avoid interfering with the case in a state that the case is at the first position, and a second portion separated farther from the one end edge than the first portion in the second direction, having a height from the reference surface higher than that of the first portion, and configured to fit into the recess of the case in the state that the case is at the second position.

* * * * *